United States Patent [19]

Goldman

[11] Patent Number: 5,558,897
[45] Date of Patent: *Sep. 24, 1996

[54] MILK COMPOSITION CONTAINING FIBER AND METHOD FOR MAKING SAME

[76] Inventor: Marc S. Goldman, 316 Prospect Ave., PH2, Hackensack, N.J. 07601

[ * ] Notice: The term of this patent shall not extend beyond the expiration date of Pat. No. 5,447,741.

[21] Appl. No.: 418,149

[22] Filed: Apr. 5, 1995

Related U.S. Application Data

[63] Continuation-in-part of Ser. No. 223,042, Apr. 5, 1994, Pat. No. 5,447,741.

[51] Int. Cl.$^6$ .............................. A23C 9/154; A23C 9/20
[52] U.S. Cl. .............................. 426/580; 426/72; 426/74; 426/573
[58] Field of Search ..................... 426/580, 573, 426/72, 74

[56] References Cited

U.S. PATENT DOCUMENTS

| | | |
|---|---|---|
| 2,761,780 | 2/1952 | Stewart . |
| 3,025,164 | 7/1959 | Metzger . |
| 3,298,838 | 5/1963 | Villarreal . |
| 3,558,323 | 1/1971 | Cannalonga et al. ................... 426/580 |
| 4,219,583 | 8/1980 | Igoe ......................................... 426/580 |
| 4,232,054 | 11/1980 | Durlach . |
| 4,389,425 | 6/1981 | Burr, II . |
| 4,701,329 | 10/1987 | Nelson et al. ........................... 426/580 |
| 4,797,289 | 1/1989 | Reddy . |
| 4,961,934 | 2/1989 | Iwasaki . |
| 5,066,500 | 11/1991 | Gil et al. .................................... 426/72 |
| 5,114,729 | 5/1992 | D'Aprigny . |
| 5,229,136 | 7/1993 | Mark et al. ............................... 426/72 |
| 5,234,704 | 8/1993 | Devine . |
| 5,260,279 | 11/1993 | Greenberg . |

FOREIGN PATENT DOCUMENTS 175886  7/1987  Japan .

OTHER PUBLICATIONS

Food Applications of Sunfiber.

*Primary Examiner*—Helen Pratt
*Attorney, Agent, or Firm*—Cushman Darby & Cushman, L.L.P.

[57] ABSTRACT

The present invention relates to a milk composition containing milk and up to about 0.0205 weight percent soluble dietary fiber prepared from guar gum which has been enzymatically hydrolyzed, and methods for making same. The milk composition may also contain non-fat milk solids and/or vitamins and minerals.

53 Claims, No Drawings

5,558,897

MILK COMPOSITION CONTAINING FIBER AND METHOD FOR MAKING SAME

This is a continuation-in-part of application Ser. No. 08/223,042, filed Apr. 5, 1994, now 5,447,741 the entire contents of which are incorporated herein by reference.

FIELD OF THE INVENTION

The present invention relates to a milk beverage that contains fiber. More particularly, the present invention relates to a milk composition that contains fiber prepared from guar gum which has been enzymatically hydrolyzed, where the milk composition has a low viscosity.

BACKGROUND OF THE INVENTION

Because of the dietary need for both fiber and milk, it would be advantageous if a milk product existed that contained fiber. Heretofore, however, it was not feasible to produce a milk product that contained fiber in any nutritionally beneficial amounts. Whereas the daily dietary requirements of fiber for humans is high (for instance, the Food and Drug Administration guidelines specify that the recommended daily intake of fiber should be about 25 grams per adult), the amount of fiber that will stay in suspension with milk is conventionally quite low. Attempts to produce a milk product containing a nutritional amount of dietary fiber resulted in most of the fiber precipitating out.

It would also be advantageous if a milk product existed that contained nutritive amounts of both fiber and vitamins and minerals. However, vitamins and minerals often impart an undesirable taste to milk.

The present invention resolves these difficulties in that it provides a milk product that contains nutritionally beneficial amounts of fiber in solution with the milk. The invention also provides a milk product that contains nutritional amounts of both fiber and vitamins and minerals, without jeopardizing the integrity or taste of the milk.

SUMMARY OF THE INVENTION

It is an object of the present invention to provide a milk beverage that contains dietary fiber in nutritional amounts, while retaining a low viscosity in the character of the milk beverage.

The present invention relates to a milk composition comprising milk and soluble dietary fiber prepared from guar gum which has been enzymatically hydrolyzed. The amount of dietary fiber present in the milk composition is high enough so as to provide significant nutritional benefits (for instance, up to about 20% RDA for adults), while retaining a relatively low viscosity (for instance, not greater than about 70 cp). The milk may include, for instance, skim milk, ½% low-fat milk, 1% low-fat milk, 2% low-fat milk, whole milk, lactose-reduced milk, cholesterol-reduced milk and cultured milk. Preferably, the fiber stays in solution with the milk and does not settle out.

In another embodiment, the present invention relates to a milk composition comprising soluble dietary fiber, such as the composition described above, which further comprises non-fat milk solids.

In a further embodiment, the present invention relates to a milk composition comprising soluble dietary fiber, such as the composition described above, which further comprises vitamins and minerals. For instance, the composition may include vitamins such as vitamins A, $B_6$, $B_{12}$, C, D, E, niacin, folic acid, biotin, pantothenic acid, and may include minerals such as zinc.

The invention also contemplates a milk composition comprising soluble dietary fiber, such as the composition described above, which further comprises both non-fat milk solids and vitamins and minerals.

In addition, the present invention relates to a method of making a milk composition having high amounts of dietary fiber (for instance, up to about 5 grams per 8 ounces or about 0.0205 weight percent, which is about 20% RDA for adults), which method comprises the step of mixing together milk and soluble dietary fiber prepared from guar gum which has been enzymatically hydrolyzed. The milk may include, for instance, skim milk, ½% low-fat milk, 1% low-fat milk, 2% low-fat milk, whole milk, lactose-reduced milk, cholesterol-reduced milk and cultured milk.

The method may further comprise the step of adding non-fat milk solids, and/or the step of adding vitamins and minerals. In addition, the method may further comprise the steps of pasteurizing or ultrapasteurizing.

DETAILED DESCRIPTION OF THE INVENTION

It has been found that adding certain soluble dietary fiber to milk can provide a beverage that significantly supplements nutritional dietary fiber intake, while retaining a relatively low viscosity of the finished milk product. Specifically, the finished milk product can contain up to about 0.0205 weight percent dietary fiber, which will provide up to about 20% RDA of dietary fiber. Preferably, the milk composition will have a viscosity not greater than about 70 cp, and preferably less than about 68 cp (most preferably, less than about 65 cp). The fiber contemplated by the invention is prepared from guar gum which has been enzymatically hydrolyzed. In particular, the hydrolyzed guar gum is commercially available from Sandoz Nutrition Corp. (Minneapolis, Minn.) under the trade name Benefiber. It is also commercially available from Taiyo Kagaku Co., Ltd. (Japan) under the trade name SunFiber.

The guar gum is hydrolyzed by the enzyme β-mannase from *Aspergillus niger*. After hydrolysis, the guar gum may be refined by activated carbon, sterilized and spray-dried. Prior to hydrolysis, the molecular weight of guar gum is approximately 200,000. Following hydrolysis, the molecular weight is 20,000 to 30,000. However, for use in this invention the molecular weight may vary. Ideally, the amount of the fiber should not exceed about 0.205 weight percent (or about 5 grams of fiber per 8 ounces of milk product). The viscosity of the finished milk product will preferably not exceed about 70 cp.

Preferably, the soluble dietary fiber remains in solution with the milk, and does not settle out. To that end, amounts of the dietary fiber as high as about 0.0164 weight percent (or 4.0 grams of fiber per 8 ounces of milk) can remain in solution in the milk composition, without settling. If the milk composition contains amounts of the dietary fiber higher than about 0.0164 weight percent, some settling may occur.

The term "milk" as contemplated by the invention is intended to include all types of milk and milk products, such as for instance, skim milk, ½% low-fat milk, 1% low-fat milk, 2% low-fat milk, whole milk, lactose-reduced milk, cholesterol-reduced milk and cultured milk, or mixtures thereof. Preferably, the milk is from a cow.

Optionally, the milk composition may further comprise natural or artificial flavoring. Examples of flavoring include chocolate, strawberry, vanilla, coffee, banana or peanut butter flavoring.

In another embodiment of the invention, the milk composition may further comprise non-fat milk solids. It is advantageous to fortify milk with non-fat milk solids to improve the taste and texture of the finished product. The term "non-fat milk solids" in connection with this invention is well known in the art, and denotes a combination of protein, carbohydrates, minerals and vitamins, such as would be obtained from dried or dehydrated skim milk or condensed skim milk. If the milk is skim milk, it is preferable that the non-fat milk solids comprise about 3% by weight of the skim milk. If the milk is ½% low-fat milk, it is preferable that the non-fat milk solids comprise about 3% by weight of the ½% low-fat milk. If the milk is 1% low-fat milk, it is preferable that the non-fat milk solids comprise about 2% by weight of the 1% low-fat milk. If the milk is 2% low-fat milk, it is preferable that the non-fat milk solids comprise about 1.5% by weight of the 2% low-fat milk. If the milk is whole milk, it is preferable that the non-fat milk solids comprise about 1.5% by weight of the whole milk.

In a further embodiment, the milk composition may further comprise at least one vitamin and at least one mineral. Preferably, the vitamins include vitamins A, $B_6$, $B_{12}$, C, D, E, niacin, folic acid, biotin and/or pantothenic acid. Preferably, the mineral includes zinc. For example, a preferable embodiment would be where vitamin A comprises about 0.0909% weight percent of the milk composition, vitamin $B_6$ comprises about 0.0069% weight percent of the milk composition, vitamin $B_{12}$ comprises about 0.0164% weight percent of the milk composition, vitamin C comprises about 0.3055% weight percent of the milk composition, vitamin D comprises about 0.0114% weight percent of the milk composition, vitamin E comprises about 0.1637% weight percent of the milk composition, niacin comprises 0.05% weight percent of the milk composition, folic acid comprises about 0.0011% weight percent of the milk composition, biotin comprises about 0.75% weight percent of the milk composition, pantothenic acid comprises about 0.0297% weight percent of the milk composition, and zinc comprises about 0.0447% weight percent of the milk composition.

In another embodiment, the milk composition further comprises both the non-fat milk solids, as discussed hereinabove, and at least one vitamin and at least one mineral, as discussed hereinabove.

In a further embodiment, the present invention relates to a method of making a milk composition having amounts of the dietary fiber as high as about 0.0205 weight percent. The method comprises the step of mixing together milk and soluble dietary fiber prepared from guar gum which has been enzymatically hydrolyzed.

As discussed hereinabove, it is preferable that the soluble dietary fiber remains in solution with the milk. For instance, amounts of the dietary fiber as high as about 0.0164 weight percent can remain in solution in the milk composition, without settling.

Optionally, the method may further comprise the step (or steps) of homogenizing, pasteurizing and/or ultrapasteurizing the milk, either before the soluble dietary fiber is added or after.

Further, the method may further comprise the step of adding flavoring, either before the soluble dietary fiber is added or after. Examples of flavoring include chocolate, strawberry, vanilla, coffee, banana or peanut butter flavoring.

Additionally, the method may further comprise the step of adding non-fat milk solids, either before the soluble dietary fiber is added or after. If the milk is skim milk, it is preferable that the non-fat milk solids comprise 3% by weight of the skim milk. If the milk is ½% low-fat milk, it is preferable that the non-fat milk solids comprise about 3% by weight of the ½% low-fat milk. If the milk is 1% low-fat milk, it is preferable that the non-fat milk solids comprise about 2% by weight of the 1% low-fat milk. If the milk is 2% low-fat milk, it is preferable that the non-fat milk solids comprise about 1.5% by weight of the 2% low-fat milk. If the milk is whole milk, it is preferable that the non-fat milk solids comprise about 1.5% by weight of the whole milk.

Further, the method may further comprise the step of adding at least one vitamin and at least one mineral, either before the soluble dietary fiber is added or after. Preferably, the vitamins include vitamins A, $B_6$, $B_{12}$, C, D, E, niacin, folic acid, biotin and/or pantothenic acid. Preferably, the mineral includes zinc. For example, a preferable embodiment would be where vitamin A comprises about 0.0909% weight percent of the milk composition, vitamin $B_6$ comprises about 0.0069% weight percent of the milk composition, vitamin $B_{12}$ comprises about 0.0164% weight percent of the milk composition, vitamin C comprises about 0.3055% weight percent of the milk composition, vitamin D comprises about 0.0114% weight percent of the milk composition, vitamin E comprises about 0.1637% weight percent of the milk composition, niacin comprises 0.05% weight percent of the milk composition, folic acid comprises about 0.0011% weight percent of the milk composition, biotin comprises about 0.075% weight percent of the milk composition, pantothenic acid comprises about 0.0297% weight percent of the milk composition, and zinc comprises about 0.0447% weight percent of the milk composition.

In another embodiment, the present invention relates to a method of making the above-described milk compositions, which method comprises the steps of:

(i) mixing together milk and at least one vitamin and at least one mineral;

(ii) mixing non-fat milk solids with the result of step (i);

(iii) mixing up to about 0.0205 weight percent soluble dietary fiber with the result of step (ii), which fiber is prepared from guar gum which has been enzymatically hydrolyzed, to form a milk composition.

The specific order of mixing the components of steps (i), (ii) and (iii) (i.e., the fiber, vitamins and minerals, and non-fat milk solids) into the milk is not critical to practicing the invention. For instance, the non-fat milk solids may first be mixed with milk, then the soluble dietary fiber may be added, and lastly the at least one vitamin and at least one mineral may be added.

It is preferable that the at least one vitamin, the at least one mineral, the non-fat milk solids and the soluble dietary fiber remain in solution with the milk.

The invention is further described in the following non-limiting examples, which are set forth for illustrative purposes only.

EXAMPLE 1

Dietary fiber prepared from guar gum which has been enzymatically hydrolyzed (called Benefiber) was obtained from Sandoz Nutrition. The fiber was thoroughly mixed into 2% milk until the fiber went into solution with the milk. The amount of fiber added was the equivalent 3 grams of fiber per 8 ounces (240 ml) of milk, as this was determined to be the highest level of dietary fiber that could be added to the milk without jeopardizing the integrity of the final milk products. As determined by experiments, this combination gave the best texture and smoothest mouth feeling, without settling at the bottom or leaving any aftertaste. Also, it provided about 10% of the recommended daily intake (RDI) per 8 ounce serving (according to FDA guidelines).

This milk composition was successfully prepared on plant scale using 500 gallons of 2% low-fat milk.

EXAMPLE 2

A number of experiments were conducted to meet the objective of fortifying milk products with fiber and vitamins and minerals at the highest possible level, without jeopardizing the integrity of these products.

A plant run was done where a premix of vitamins and minerals in the amounts indicated in Table A were added to 2% low-fat milk (use rate 110 mg premix/8 ounce milk). (The milk was first standardized.) The premix was added and mixed for 20 minutes. It was then pasteurized and homogenized on H.T.S.T. #2 ("High Temperature, Short Time") at 170° F. for 15 seconds, and cooled to 40° F.

The resulting milk product contained vitamins and minerals providing 25% of the U.S.R.D.I. per 8 ounces of milk product. It had a normal color, no aftertaste, and in blind taste tests, no one could tell the difference from 2% milk that was not fortified.

Dietary fiber (as described above) may then be mixed into the milk product (3 grams of fiber per 8 ounces of milk). The resulting milk product will contain dietary fiber providing about 10% of the recommended daily intake (RDI) per 8 ounce serving.

EXAMPLE 3

A number of experiments were conducted to meet the objective of fortifying milk products with fiber and non-fat milk solids at the highest possible level, without jeopardizing the integrity of these products.

A plant run was done where skim milk, 1% low-fat milk, 2% low-fat milk, and 3.25% (whole) milk were fortified with non-fat milk solids to improve the taste and the texture of the milk.

The experiments were done first in the lab to determine the right level of non-fat milk solids to be added. The best result was to add 3% non-fat milk solids to the skim milk, 2% non-fat milk solids to the low-fat 1% milk, and 1.5% nonfat milk solids to the low-fat 2% milk and 3.25% milk.

The plant scaled experiments were done by standardizing the percent butterfat of the milk, adding the non-fat milk solids mix for 20 minutes, testing the B.F. % (butter fat) and T.S. % (total solid), pasteurizing and homogenizing the products on H.T.S.T. #2.

The taste of the finished products was very good, with good mouth feeling and texture on all the products. The resulting product also have 35% more calcium than the RDI and 38% more protein.

Dietary fiber (as described above) may then be mixed into the milk product (3 grams of fiber per 8 ounces of milk). The resulting milk product will contain dietary fiber providing about 10% of the recommended daily intake (RDI) per 8 ounce serving.

EXAMPLE 4

Experiments were conducted to meet the objective of fortifying milk products with fiber, vitamins and minerals, and non-fat milk solids at the highest possible level, without jeopardizing the integrity of these products.

The plant experiments were done as indicated in the Examples above, with the vitamin and the mineral premix of Table A being added with non-fat milk solids to 2% milk and the products were mixed, pasteurized and homogenized as before. The finished product was very good, with good mouth feeling, no aftertaste, and nice color.

Fiber was then added to the products that were already fortified with non-fat milk solids and vitamin/mineral premix (3 grams of fiber per 8 ounces of product).

The experiments were done on plant scale using 500 gallons of 2% low-fat milk. The finished product was very good.

EXAMPLE 5

Further experiments were conducted on a plant scale, using 500 gallons of skim milk/1% low-fat milk/2% low-fat milk, and 3.25 B.F. milk fortified with the non-fat milk solids, the vitamin and mineral premix and the fiber. The resulting milk products were excellent, with no settling out or leaving any aftertaste of any of the fiber, vitamins, minerals or non-fat milk solids.

Although the vitamin and mineral premix and the fiber could be added after the product is pasteurized, it is preferable to add them before the pasteurization to prevent any contamination. These products could also be ultra-pasteurized at 280° F for 2 seconds.

EXAMPLE 6

A number of experiments were conducted to meet the objective of fortifying milk products with fiber, vitamins, minerals and non-fat milk solids at the highest possible level, while minimizing settling out of the fiber and negative aftertaste and mouthfeel of the milk products.

Dietary fiber prepared from guar gum which has been enzymatically hydrolyzed was thoroughly mixed into 2% milk until the fiber went into solution with the milk. The amount of fiber added was the of equivalent 3.1 grams of fiber per 8 ounces (240 ml) of milk. The resulting milk product contained 0.0127 weight percent dietary fiber, and had a viscosity of not more than about 51 cp. There was no settling of the fiber. The resulting milk product will contain dietary fiber providing about 12% of the recommended daily intake (RDI) per 8 ounce serving.

As determined by experiments, this combination gave a slightly unpleasant taste.

EXAMPLE 7

The experiment of Example 6 was repeated, except that the amount of fiber added was the equivalent of 3.2 grams of fiber per 8 ounces (240 ml) of milk. The resulting milk product contained 0.0131 weight percent dietary fiber, and had a viscosity of not more than about 52 cp. There was no settling of the fiber. The resulting milk product will contain dietary fiber providing about 12% of the recommended daily intake (RDI) per 8 ounce serving.

As determined by experiments, this combination also gave a slightly unpleasant taste.

EXAMPLE 8

The experiment of Example 6 was repeated, except that the amount of fiber added was the equivalent of 3.3 grams of fiber per 8 ounces (240 ml) of milk. The resulting milk product contained 0.0135 weight percent dietary fiber, and had a viscosity of not more than about 54 cp. There was no settling of the fiber. The resulting milk product will contain dietary fiber providing about 13% of the recommended daily intake (RDI) per 8 ounce serving.

As determined by experiments, this combination also gave a slightly unpleasant taste.

EXAMPLE 9

The experiment of Example 6 was repeated, except that the amount of fiber added was the equivalent of 3.4 grams of fiber per 8 ounces (240 ml) of milk. The resulting milk product contained 0.0139 weight percent dietary fiber, and had a viscosity of not more than about 58 cp. There was no settling of the fiber. The resulting milk product will contain dietary fiber providing about 13% of the recommended daily intake (RDI) per 8 ounce serving.

As determined by experiments, this combination also gave an unpleasant aftertaste.

EXAMPLE 10

The experiment of Example 6 was repeated, except that the amount of fiber added was the equivalent of 3.5 grams of fiber per 8 ounces (240 ml) of milk. The resulting milk product contained 0.0143 weight percent dietary fiber, and had a viscosity of not more than about 62 cp. There was no settling of the fiber. The resulting milk product will contain dietary fiber providing about 14% of the recommended daily intake (RDI) per 8 ounce serving.

As determined by experiments, this combination also gave an unpleasant aftertaste.

EXAMPLE 11

The experiment of Example 6 was repeated, except that the amount of fiber added was the equivalent of 4.0 grams of fiber per 8 ounces (240 ml) of milk. The resulting milk product contained 0.0164 weight percent dietary fiber, and had a viscosity of not more than about 65 cp. There was no settling of the fiber. The resulting milk product will contain dietary fiber providing about 16% of the recommended daily intake (RDI) per 8 ounce serving.

As determined by experiments, this combination also gave an unpleasant aftertaste.

EXAMPLE 12

The experiment of Example 6 was repeated, except that the amount of fiber added was the equivalent of 4.5 grams of fiber per 8 ounces (240 ml) of milk. The resulting milk product contained 0.0184 weight percent dietary fiber, and had a viscosity of not more than about 68 cp. The resulting milk product will contain dietary fiber providing about 18% of the recommended daily intake (RDI) per 8 ounce serving.

As determined by experiments, this combination also gave an unpleasant aftertaste. Also, there was some settling of the fiber.

EXAMPLE 13

The experiment of Example 6 was repeated, except that the amount of fiber added was the equivalent of 5.0 grams of fiber per 8 ounces (240 ml) of milk. The resulting milk product contained 0.0205 weight percent dietary fiber, and had a viscosity of not more than about 70 cp. The resulting milk product will contain dietary fiber providing about 20% of the recommended daily intake (RDI) per 8 ounce serving.

As determined by experiments, this combination also gave an unpleasant aftertaste. Also, there was some settling of the fiber.

I claim:

1. A milk composition comprising milk and up to about 0.0205 weight percent soluble dietary fiber prepared from guar gum which has been enzymatically hydrolyzed.

2. The milk composition according to claim 1, wherein the viscosity is not more than about 70 cp.

3. The milk composition according to claim 1 which contains up to about 0.0164 weight percent soluble dietary fiber.

4. The milk composition according to claim 3, wherein the soluble dietary fiber remains in solution with the milk.

5. The milk composition according to claim 1, wherein the milk is selected from the group consisting of skim milk, ½% low-fat milk, 1% low-fat milk, 2% low-fat milk, whole milk, lactose-reduced milk, cholesterol-reduced milk and cultured milk.

6. The milk composition according to claim 1, which further comprises flavoring.

7. The milk composition according to claim 6, wherein the flavoring includes chocolate, strawberry, vanilla, coffee, banana or peanut butter flavoring.

8. The milk composition according to claim 1, which further comprises non-fat milk solids.

9. The milk composition according to claim 8, wherein the non-fat milk solids comprise dehydrated skim milk or condensed skim milk.

10. The milk composition according to claim 9, wherein the milk is skim milk and the non-fat milk solids comprise 3% by weight of the skim milk.

11. The milk composition according to claim 9, wherein the milk is ½% low-fat milk and the non-fat milk solids comprise 3% by weight of the ½% low-fat milk.

12. The milk composition according to claim 9, wherein the milk is 1% low-fat milk and the non-fat milk solids comprise 2% by weight of the 1% low-fat milk.

13. The milk composition according to claim 9, wherein the milk is 2% low-fat milk and the non-fat milk solids comprise 1.5% by weight of the 2% low-fat milk.

14. The milk composition according to claim 9, wherein the milk is whole milk and the non-fat milk solids comprise 1.5% by weight of the whole milk.

15. The milk composition according to claim 1, which further comprises at least one vitamin and at least one mineral.

16. The milk composition according to claim 15, wherein the vitamins are vitamins A, $B_6$, $B_{12}$, C, D, E, niacin, folic acid, biotin and pantothenic acid, and the mineral is zinc.

17. The milk composition according to claim 15, which further comprises non-fat milk solids.

18. The milk composition according to claim 17, wherein the non-fat milk solids comprise dehydrated skim milk or condensed skim milk.

19. The milk composition according to claim 15, wherein the milk is skim milk and the non-fat milk solids comprise 3% by weight of the skim milk.

20. The milk composition according to claim 18, wherein the milk is ½% low-fat milk and the non-fat milk solids comprise 3% by weight of the ½% low-fat milk.

21. The milk composition according to claim 18, wherein the milk is 1% low-fat milk and the non-fat milk solids comprise 2% by weight of the 1% low-fat milk.

22. The milk composition according to claim 18, wherein the milk is 2% low-fat milk and the non-fat milk solids comprise 1.5% by weight of the 2% low-fat milk.

23. The milk composition according to claim 18, wherein the milk is whole milk and the non-fat milk solids comprise 1.5% by weight of the whole milk.

24. A method of making a milk composition, which comprises the step of mixing together milk and up to about 0.0205 weight percent soluble dietary fiber prepared from guar gum which has been enzymatically hydrolyzed.

25. The method according to claim 24, wherein the viscosity is not more than about 70 cp.

26. The method according to claim 24, wherein the composition contains up to about 0.0164 weight percent soluble dietary fiber.

27. The method according to claim 26, wherein the soluble dietary fiber remains in solution with the milk.

28. The method according to claim 24, wherein the milk is selected from the group consisting of skim milk, ½% low-fat milk, 1% low-fat milk, 2% low-fat milk, whole milk, lactose-reduced milk, cholesterol-reduced milk and cultured milk.

29. The method according to claim 24, which further comprises the step of pasteurizing.

30. The method according to claim 24, which further comprises the step of ultra-pasteurizing.

31. The method according to claim 24 which further comprises the step of adding flavoring.

32. The method according to claim 31, wherein the flavoring includes chocolate, strawberry, vanilla, coffee, banana or peanut butter flavoring.

33. The method according to claim 24 which further comprises the step of adding non-fat milk solids.

34. The method according to claim 33, wherein the non-fat milk solids comprise dehydrated skim milk or condensed skim milk.

35. The method according to claim 33, wherein the milk is skim milk and the non-fat milk solids comprise 3% by weight of the skim milk.

36. The method according to claim 33, wherein the milk is ½% low-fat milk and the non-fat milk solids comprise 3% by weight of the ½% low-fat milk.

37. The method according to claim 33, wherein the milk is 1% low-fat milk and the non-fat milk solids comprise 2% by weight of the 1% low-fat milk.

38. The method according to claim 33, wherein the milk is 2% low-fat milk and the non-fat milk solids comprise 1.5% by weight of the 2% low-fat milk.

39. The method according to claim 33, wherein the milk is whole milk and the non-fat milk solids comprise 1.5% by weight of the whole milk.

40. The method according to claim 24, which further comprises the step of adding at least one vitamin and at least one mineral.

41. The method according to claim 40, wherein the vitamin is vitamins A, $B_6$, $B_{12}$, C, D, E, niacin, folic acid, biotin and pantothenic acid, and the mineral is zinc.

42. A method of making a milk composition which comprises the steps of:

(i) mixing together milk and at least one vitamin and at least one mineral;

(ii) mixing non-fat milk solids with the result of step (i);

(iii) mixing up to about 0.0205 weight percent soluble dietary fiber with the result of step (ii), which fiber is prepared from guar gum which has been enzymatically hydrolyzed, to form a milk composition.

43. The method according to claim 42, wherein the viscosity of the milk composition is not more than 70 cp.

44. The method according to claim 42, wherein in step (iii) up to about 0.0164 weight percent soluble dietary fiber with the result of step (ii).

45. The method according to claim 42, wherein the at least one vitamin, the at least one mineral, the non-fat milk solids and the soluble dietary fiber remain in solution with the milk.

46. The method according to claim 42, which further comprises the step of pasteurizing the milk composition.

47. The method according to claim 42, wherein the milk is skim milk and the non-fat milk solids comprise 3% by weight of the skim milk.

48. The method according to claim 42, wherein the milk is ½% low-fat milk and the non-fat milk solids comprise 3% by weight of the ½% low-fat milk.

49. The method according to claim 42, wherein the milk is 1% low-fat milk and the non-fat milk solids comprise 2% by weight of the 1% low-fat milk.

50. The method according to claim 42, wherein the milk is 2% low-fat milk and the non-fat milk solids comprise 1.5% by weight of the 2% low-fat milk.

51. The method according to claim 42, wherein the milk is whole milk and the non-fat milk solids comprise 1.5% by weight of the whole milk.

52. The method according to claim 42, wherein the vitamin is vitamins A, $B_6$, $B_{12}$, C, D, E, niacin, folic acid, biotin and pantothenic acid, and the mineral is zinc.

53. The method according to claim 52, wherein vitamin A comprises about 0.0909% weight percent of the milk composition, vitamin $B_6$ comprises about 0.0069% weight percent of the milk composition, vitamin $B_{12}$ comprises about 0.0164% weight percent of the milk composition, vitamin C comprises about 0.3055% weight percent of the milk composition, vitamin D comprises about 0.0114% weight percent of the milk composition, vitamin E comprises about 0.1637% weight percent of the milk composition, niacin comprises about 0.05% weight percent of the milk composition, folic acid comprises about 0.0011% weight percent of the milk composition, biotin comprises about 0.075% weight percent of the milk composition, pantothenic acid comprises about 0.0297% weight percent of the milk composition, and zinc comprises about 0.0447% weight percent of the milk composition.

* * * * *